United States Patent [19]
Yamada

[11] Patent Number: 5,528,719
[45] Date of Patent: Jun. 18, 1996

[54] OPTICAL FIBER GUIDE STRUCTURE AND METHOD OF FABRICATING SAME

[75] Inventor: Atsushi Yamada, Hamura, Japan

[73] Assignee: Sumitomo Metal Mining Company Limited, Tokyo, Japan

[21] Appl. No.: 329,312

[22] Filed: Oct. 26, 1994

[30] Foreign Application Priority Data

Oct. 26, 1993 [JP] Japan .................................. 5-267311
Sep. 26, 1994 [JP] Japan .................................. 6-229457

[51] Int. Cl.$^6$ .................................................. G02B 6/00
[52] U.S. Cl. .................................................. 385/137
[58] Field of Search ............................ 385/14, 130, 131, 385/137, 132

[56] References Cited

U.S. PATENT DOCUMENTS

| | | | |
|---|---|---|---|
| 4,007,978 | 2/1977 | Holton | 385/14 |
| 4,067,641 | 1/1978 | Holton | 385/131 |
| 4,466,696 | 8/1984 | Carney | 385/49 |
| 4,883,561 | 11/1989 | Gmitter et al. | 385/130 |
| 5,357,122 | 10/1994 | Okubora et al. | 385/14 |

FOREIGN PATENT DOCUMENTS

| | | |
|---|---|---|
| 6208039 | 7/1994 | Japan . |
| 6230246 | 8/1994 | Japan . |
| 6235827 | 8/1994 | Japan . |

*Primary Examiner*—Rodney B. Bovernick
*Assistant Examiner*—Robert E. Wise
*Attorney, Agent, or Firm*—Watson Cole Stevens Davis

[57] ABSTRACT

An optical fiber guide structure used in industrial applications and a method of fabricating this structure. The optical fiber guide structure is excellent in dimensional accuracy, produces only small connection losses, and facilitates axial alignments and positioning. The method is initiated with preparing a silicon single-crystal substrate having a face of (110) orientation. An etching stopping layer, an epitaxial silicon layer, and a masking layer of silicon oxide are successively formed on the substrate. A photoresist is applied to the surface of the masking layer. Then, a development step, an etching step, and a peeling step are carried out. Thus, a substrate provided with rectangular grooves extending parallel to a (111) plane of the substrate is fabricated.

18 Claims, 7 Drawing Sheets

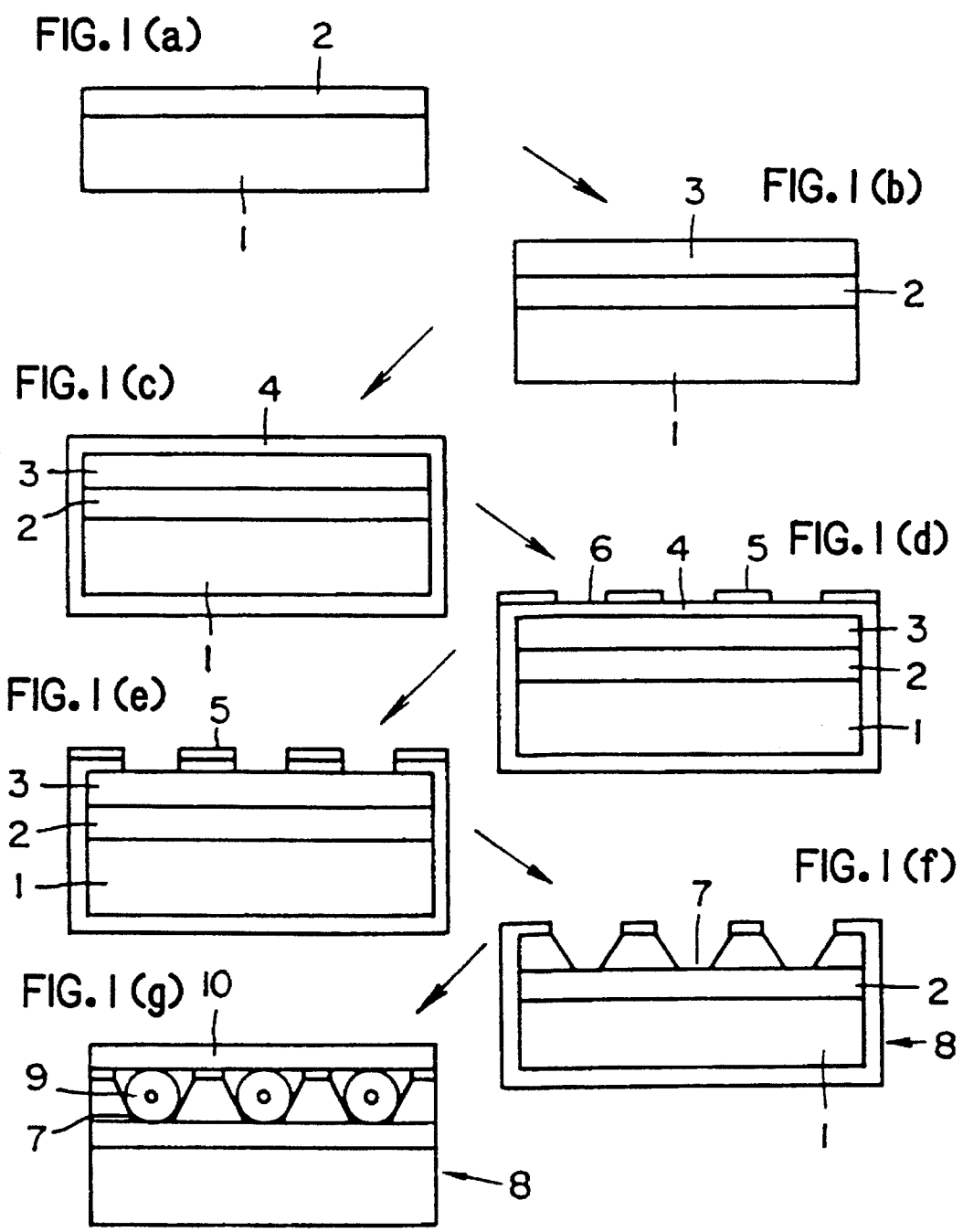

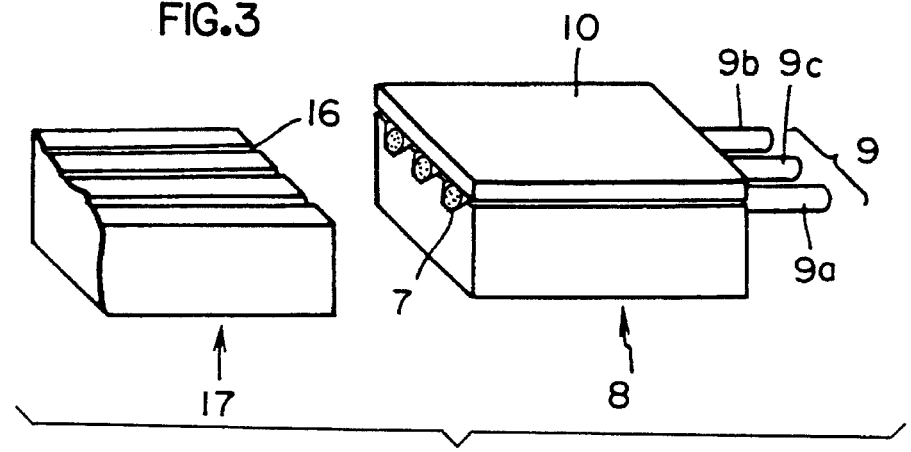
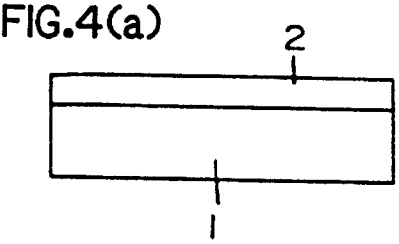
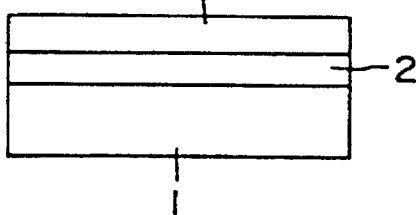
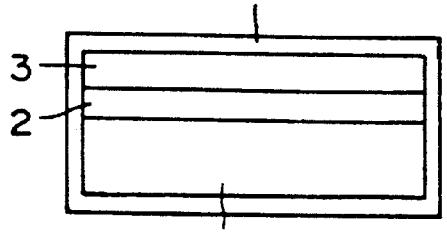
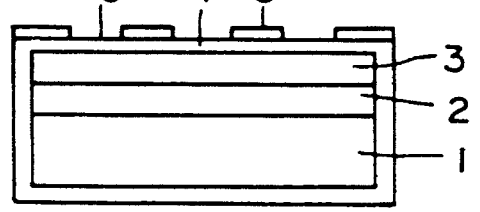
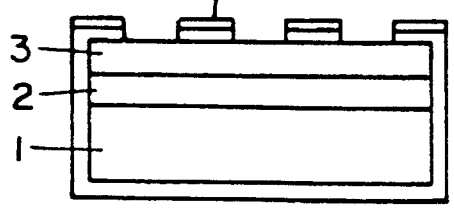
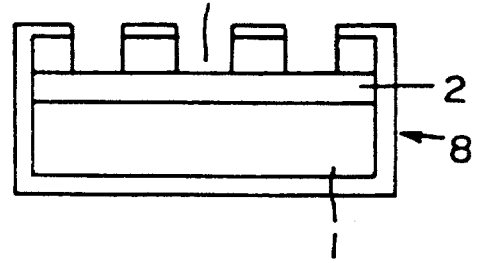
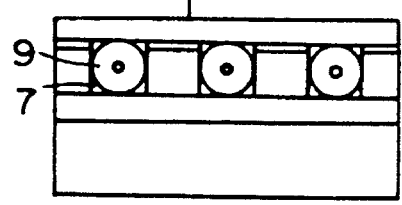

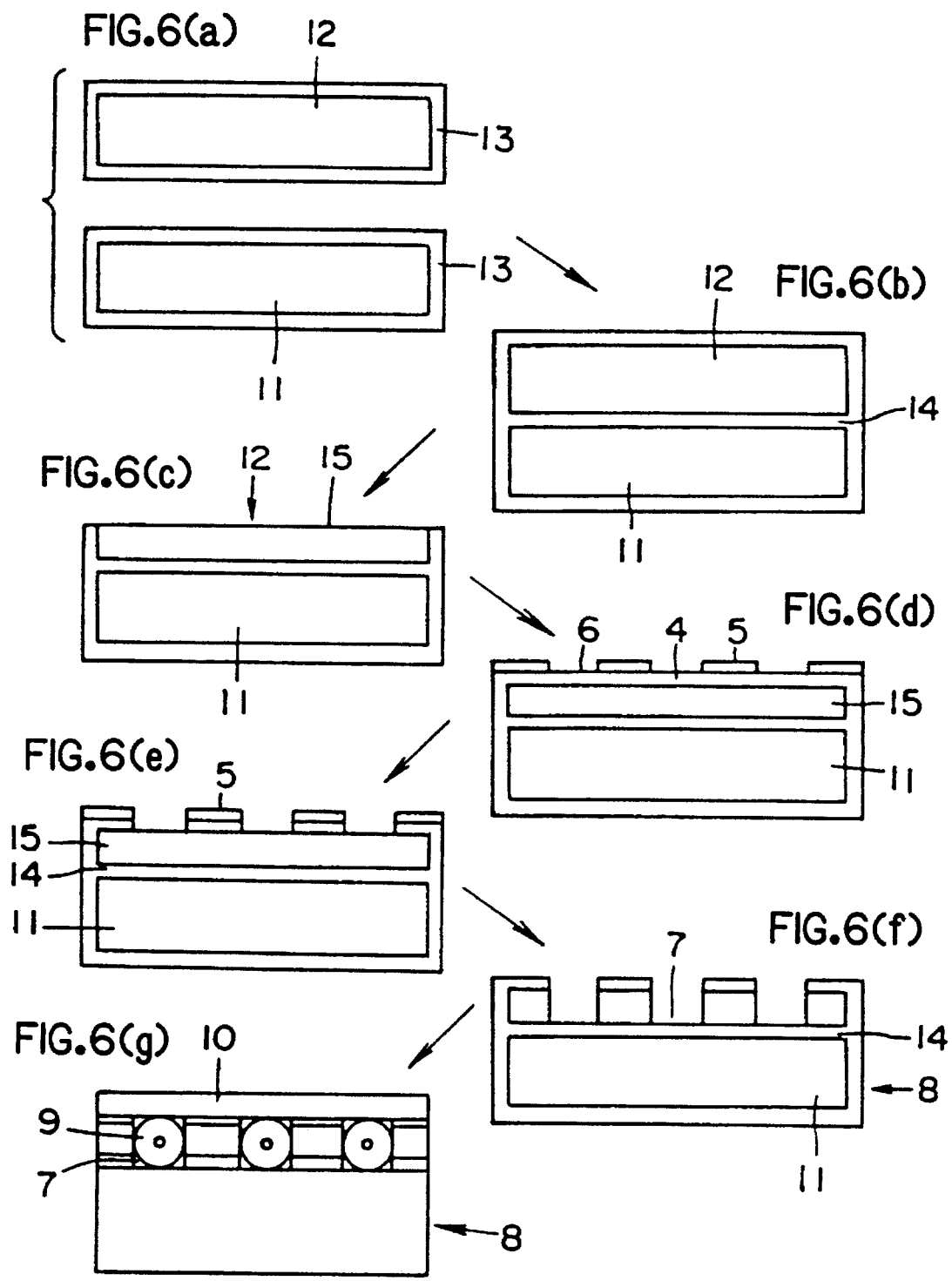

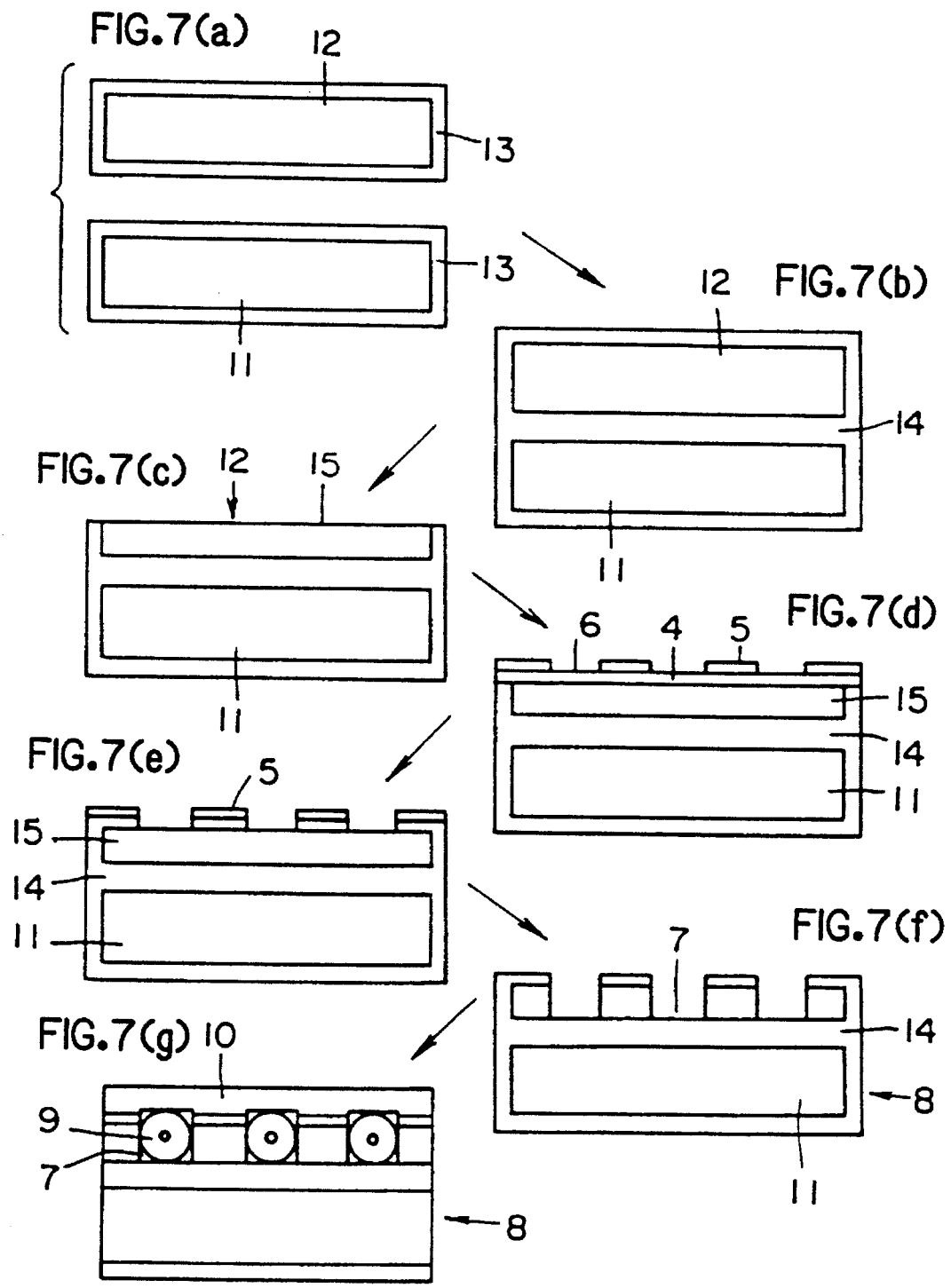

OPTICAL FIBER GUIDE STRUCTURE AND METHOD OF FABRICATING SAME

FIELD OF THE INVENTION

The present invention relates to a structure for guiding optical fibers and, more particularly, to an optical fiber guide structure used in an interconnection system between various control systems and computers used in industrial applications and to a method of fabricating such an optical fiber guide structure.

BACKGROUND OF THE INVENTION

In order to complete an optical circuit by interconnecting optical circuit elements with optical fibers, it is necessary to accurately align the cores of the optical fibers with the optical axes of the optical circuit elements. To facilitate the alignment with the optical axes, optical fiber guide structures have been employed. For example, at the terminals of optical integrated circuits such as integrated light switches or optical couplers, a multicore optical connector is used to connect plural optical fibers in a batch according to plural optical waveguides. At this time, at the junctions of the optical waveguides and the optical fibers, connection loss occurs. As the degree of alignment of the optical waveguides with the optical fibers is enhanced, the connection loss decreases advantageously. Accordingly, multicore optical connectors capable of accurately setting the positions at which the optical fibers are fixed have been required.

A conventional multicore optical connector comprises a semiconductor substrate made of silicon (Si), gallium arsenide (GaAs), or other material. Grooves of V-shaped cross section are formed in the substrate by anisotropic etching. FIG. 10 is a cross sectional view of an optical fiber guide structure 28 having such V-grooves. A plurality of V-grooves 27 are formed in the top surface of a substrate 21. Optical fibers 29 are held in these grooves. Under this condition, the connector is used.

Also, a substrate similarly provided with V-grooves is used to interconnect optical elements by optical fibers. In particular, the optical elements such as a light source, polarizers, and collimators are arranged on the substrate and aligned to a given optical axis. The optical fibers are held in these V-grooves. Thus, the optical elements can be optically interconnected.

The V-grooves 27 in the optical fiber guide structure 28 are formed in the manner described now. The top surface of the silicon substrate 21 is of (100) orientation. This top surface is coated with a masking material such as silicon oxide (SiO$_2$), platinum (Pt), or titanium (Ti). Windows of a given width are formed photolithographically such that they are regularly spaced from each other. Then, an etching operation is carried out within an anisotropic etchant such as aqueous solution of potassium hydroxide, aqueous solution of ethylenediamine-pyrocatechol, or aqueous solution of hydrozine. As a result, the V-grooves 27 are formed.

In this V-grooved structure for alignment of optical fibers, each optical fiber 29 is held by two inclined surfaces 27a and 27b of each V-groove 27. Therefore, even if the dimensional accuracy of the V-grooves 27 is not high and the widths 27c of the windows differ from each other considerably, the optical axes 29a of the optical fibers 29 hardly move horizontally. However, if the widths 27c of the windows are too great, the positions of the optical axes 29a of the fibers 29 are lowered. Conversely, if the widths 27c of the windows are too small, the positions of the optical axes 29a of the fibers 29 are raised. In this way, with respect to the vertical direction, the positions of the optical axes 29a of the optical fibers 29 are varied greatly.

It is easy to spread the terminals of optical waveguides horizontally, in which case the horizontal accuracy of multicore connectors does not present serious problems. However, it is difficult to spread the terminals of optical waveguides vertically. It is required that the optical axes of multicore optical connectors be placed in position at high accuracy, especially vertically.

For optical elements not assuming the form of an optical waveguide such as light sources, polarizers, and collimators, it cannot be expected that the effect of misalignment of optical axes is reduced by modifying the shape of the terminals of the optical waveguides as mentioned above. Hence, the optical axes are required to be placed in position at high accuracy both horizontally and vertically.

However, where the V-shaped grooves are formed by anisotropic etching, it is inevitable that the widths of the windows in the V-grooves differ from each other to some extent because of the presence of residual stress and crystal defects in the substrate and because the reaction rate differs from location to location within the etchant. Consequently, where the aforementioned multicore optical connectors are used or where optical elements aligned with given optical axes on a substrate are interconnected by optical fibers, the accuracy at which the optical axes are placed in position can be improved only up to ±0.5 μm. For this reason, the prior art optical fiber guide structure suffers from large connection loss due to vertical shifts of optical fibers. Also, much labor is required to place the optical fiber guide structure in an optimum position where the connection loss is reduced to a minimum.

SUMMARY OF THE INVENTION

In view of the foregoing situations, the present invention has been made. It is an object of the present invention to provide an optical fiber guide structure which permits optical fibers to be held at high accuracy both horizontally and vertically, suffers from only small connection loss, and facilitates axial alignments and positioning.

It is another object of the invention to provide a method of fabricating the optical fiber guide structure described in the preceding paragraph.

An optical fiber guide structure according to the present invention comprises a substrate having a silicon single-crystal layer on or close to its face. A plurality of parallel grooves extending parallel to a (111) plane of the silicon single crystal surface layer are formed. The bottom surfaces of the grooves are formed by a heavily doped p-type diffusion layer buried under the surface of the substrate, a silicon oxide layer buried under the surface of the substrate, or a silicon layer formed under a silicon oxide layer.

Preferably, the face of the silicon single-crystal layer is of (100) orientation. The face of the substrate lies in the (100) plane of the substrate. The cross sections of the grooves substantially assume the form of an inverted trapezoid.

Also, the face of the silicon single-crystal layer is preferably of (110) orientation. The face of the substrate lies in the (110) plane of the substrate. The cross sections of the grooves substantially assume the form of a rectangle.

A method of fabricating an optical fiber guide structure according to the present invention starts with forming a heavily doped p-type diffusion layer on a silicon single-crystal substrate. An undoped, n-type, or lightly doped silicon single-crystal film having the same crystallographic orientation as the aforementioned silicon single-crystal substrate is formed up to a given thickness on the heavily doped p-type diffusion layer. A masking layer is formed on top of the silicon single-crystal film. Thereafter, the masking layer is partially removed so as to form grooves. The longitudinal direction of the grooves is parallel to the (111) plane of the silicon single-crystal substrate. Subsequently, the surface portions of the silicon single-crystal film which are exposed by the removal of the masking layer are removed.

In this case, the face of the silicon single-crystal substrate preferably is of (100) orientation.

Also, the face of the silicon single-crystal substrate preferably is of (110) orientation.

Another method of fabricating an optical fiber guide structure according to the present invention starts with oxidizing the face of a silicon support substrate and the face of a silicon single-crystal seed substrate. Both faces are placed opposite to each other and brought into intimate contact with each other. They are heat-treated. The face of the silicon single-crystal seed substrate is removed to a given depth to form a silicon single-crystal film. A masking layer is formed on the face of the silicon single-crystal seed substrate over the silicon single-crystal film. Thereafter, the masking layer is partially removed so as to form grooves. The longitudinal direction of the grooves is parallel to the (111) plane of the silicon single-crystal seed substrate. Subsequently, the surface portions of the silicon single-crystal film which are exposed by the removal of the masking layer are removed.

In this case, the face of the silicon substrate can assume any arbitrary orientation. Preferably, the face of the silicon single-crystal seed crystal is of (100) orientation.

Also, the face of the silicon substrate can assume any arbitrary orientation. Preferably, the face of the silicon single-crystal seed crystal is of (110) orientation.

First, a silicon single-crystal substrate having a face of (100) or (110) orientation is prepared. A heavily doped p-type diffusion layer acting as an etching stopping layer is formed on a desired surface of the silicon single-crystal substrate. The "heavily doped" means that the dopant concentration is in excess of $10^{18}$ atoms $cm^{-3}$. Because of this high dopant concentration, the etch rate is about 1/20 of the etch rate achieved with conventional undoped silicon in an etching step (described later). That is, almost no etching takes place. In order to form the heavily doped p-type diffusion layer, a gas or a solid containing a p-type impurity element such as boron is diffused. Alternatively, ions are implanted and then annealing is performed.

Then, a layer to be etched is formed. This layer is formed by epitaxially growing an undoped, n-type, or lightly doped p-type silicon single-crystal film on the surface of the heavily doped p-type diffusion layer. At this time, the thickness of the etched layer is made equal to, or slightly smaller than, the diameter of each optical fiber, for the following reason. In order to press down the side surfaces of optical fibers from above and to maintain the fibers in contact with the bottom surfaces of the grooves, it is necessary to expose parts of the side surfaces of the fibers from the grooves.

A silicon oxide layer can be used as the etching stopping layer. The etch rate of silicon oxide is about 1/500 of the etch rate of unoxidized silicon. That is, silicon oxide is almost unetchable. First, a silicon support substrate and a silicon single-crystal seed substrate are prepared. The silicon support substrate can be made from either a single crystal or polycrystals. No restrictions are imposed on the crystallographic orientation. However, the face of the silicon single-crystal seed substrate is required to be of (100) or (110) orientation. Before the surfaces of the substrates are bonded together adhesively, they must be polished specularly to have sufficient adhesive strength and dimensional accuracy. Then, the surfaces of the silicon support substrate and of the silicon single-crystal seed substrate are oxidized by ordinary oxidation method within an ambient of oxygen to form silicon oxide layers. The faces of the substrates are brought into contact with each other. They are bonded together at a high temperature to form an integrated substrate. In the bonding step, both substrates may be mechanically pressed against each other. Also, they may be simply placed on top of each other. In this bonding step, the silicon oxide films of the bonded surfaces fuse together to form a buried silicon layer that is an etching stopping layer. The bonded silicon single-crystal seed substrate is removed until the thickness of the silicon single-crystal layer of the silicon single-crystal substrate reaches a given value. Thus, a silicon single-crystal film which is to be etched is formed. The removal method may be a conventional method such as polishing. Furthermore, etching and polishing may be used in conjunction.

A masking layer of silicon oxide is formed either on the surface of the silicon single-crystal substrate having the laminated etching stopping-layer and etched layer or on the surface of the silicon single-crystal substrate of the bonded substrates by an ordinary thermal oxidation method in which the substrates and layers are heated within oxygen or water vapor. In this way, a laminate consisting of the etching stopping layer, the etched layer, and the masking layer (silicon oxide layer) is formed. The silicon oxide film may be formed by a high-pressure oxidation method using high-pressure oxygen or by an application method in which raw materials containing siloxane are applied by a spinner or the like and then sintered.

Windows are formed in the silicon oxide film of the laminate formed as described above. A patterned photoresist is created by exposure using a mask and by development. Using this photoresist as a mask, an etching operation is performed, using solution of hydrofluoric acid such as aqueous solution of buffered hydrofluoric acid (BHF) (e.g. $HF-HFN_4-H_2O$ (hereinafter referred to as the aqueous solution of buffered hydrofluoric acid)) or $HF-HNO_3-H_2O$). These windows may be formed by dry etching. At this time, the longitudinal direction of the windows formed in the silicon oxide film is made parallel with the (111) plane of the silicon single-crystal substrate. The width of the windows in the silicon oxide film is made equal to, or slightly smaller than, the width of grooves to be formed, because (111) side surfaces are slightly etched while etching is progressing in the direction of the depths of the grooves. For example, where grooves 60 μm deep are dug, the side surfaces are etched by approximately 1 μm. The width of the openings in the grooves to be formed is so set that optical fibers touch the bottom surfaces of the grooves. Let θ be the tilt angle of the side walls of the grooves. Let r be, the radius of the optical fibers. Let d be the depth of the grooves. At least, the width w of the openings in the grooves must have the dimension $$W=2\{r \tan(\theta/2)+d/\tan \theta\}$$

If the orientation of the face of the etched layer is (100), θ=54.74°. Accordingly, as an example, if a fiber having a diameter of 125 μm should be accommodated in a groove having a depth of 80 µm, the width of the openings should be in excess of 177.84 µm. If the orientation of the face of the etched layer is (110), θ=90°. Therefore, as an example, if a fiber having a diameter of 125 µm is received in the groove, the width of the openings should be in excess of 125 µm. In consequence, if a silicon substrate of face orientation (110) is used, the opening width can be suppressed. If the length of the substrate is not changed, then more grooves, can be formed accordingly. In order to facilitate inserting optical fibers, the opening width may be set larger than the calculated value by a submicron dimension. However, if the width of the openings in the guide grooves is increased excessively, then the horizontal positions of the optical fibers will be made inaccurate. Hence, this allowance should be reduced to a minimum.

The above-described masking layer is made of silicon oxide. The masking layer may also be made of a metal film of platinum or titanium which is not attacked by the anisotropic etchant for silicon. In this case, the masking layer is formed by evaporation or sputtering. Then, windows are formed in the mask by the lift-off technique.

Then, either the epitaxially grown silicon single-crystal film or the silicon single-crystal film formed by polishing (the face of) one of the bonded substrates is etched by the anisotropic etchant. Solution of potassium hydroxide can be used as the anisotropic etchant. Aqueous solution of ethylenediamine-pyrocatechol or aqueous solution of hydrozine may also be used. This anisotropic etchant preferentially etches the (100) and (110) planes of the silicon single-crystal substrate and slowly etches the (111) plane. Therefore, the etching progresses in such a way that the (111) plane forms the side surfaces of the grooves. In this case, if the orientation of the face of the etched layer is (100), the cross sections of the grooves formed by the etching takes the form of an inverted trapezoid. If the orientation of the face of the etched layer is (110), the cross sections assume the form of a rectangle. Since these anisotropic etchants hardly etch the heavily doped p-type diffusion layer or the silicon oxide layer, even if the etchants reach it, etching no longer progresses. Consequently, a substrate is formed which is provided with grooves of inverted trapezoidal or rectangular cross section and in which the depths of the grooves of all arrays accurately agree with the thickness of silicon single-crystal layer on the etching stopping layer.

Optical fibers fitted in the grooves in the substrate fabricated in this way are kept in contact with the bottoms of the grooves and so the vertical positions of the optical fibers are maintained stationary. If the fibers are fitted into the grooves in the substrate of cross section of inverted trapezoid or rectangle and their top portions are held down by a retaining plate, then an optical fiber guide structure such as an multicore optical connector is formed. It is only necessary that the retaining plate can secure optical fibers. The retaining plate may or may not be bonded to the substrate surface with adhesive.

The orientation of the face of the silicon single-crystal layer epitaxially grown on the substrate is the same as the orientation of the silicon single-crystal plate. If the orientation of the face of the silicon single-crystal plate is (100), then the orientation of the silicon single-crystal layer epitaxially grown on the substrate is also (100). If the orientation of the face of the silicon single-crystal plate is (110), then the orientation of the silicon single-crystal layer epitaxially grown on the substrate is also (110). If the adhesively bonded substrate surface is polished to form the layer to be etched, then it is obvious that the support substrate does not depend on orientation. If the grooves are made parallel to the (111) plane of the substrate, the dimensional accuracy of the cross section, or inverted trapezoid or rectangle, is improved. If the grooves extend in other directions, the dimensional accuracy is deteriorated. If the orientation of the face is (100), then grooves extending parallel to the (111) plane can be formed in two mutually perpendicular directions on the substrate, surface by the aforementioned anisotropic etching. If the face orientation is (110), then grooves extending parallel to the (111) plane can be formed in two directions crossing at an angle of 70.52° on the substrate surface.

Because the (111) side surfaces are slightly etched while etching is progressing in the direction of thickness of the grooves, an oxide film of the masking layer is left at the top ends of the grooves. The remaining portions of the oxide film extend on the order of 1 µm and take the form of a visor. When optical fibers are inserted, such an unsupported thin oxide film may collide with the side and end surfaces of the optical fibers and may fall as fragments. If such fragments come to the optical axes of optical fibers and other optical parts and adhere to them, then the fragments scatter and attenuate light. Therefore, after the end of the anisotropic etching, the remaining masking oxide film is preferably removed within the above-described aqueous solution of buffered hydrofluoric acid. At this time, if the etched layer is formed by adhesive bonding, it follows that the buried oxide film exposed by the formation of the grooves is removed simultaneously. However, the thickness of the buried oxide film is kept constant at a high accuracy. Therefore, the underlying silicon substrate surface which is exposed by removing the buried oxide film has also a high degree of flatness. In consequence, one feature of the invention, i.e., the bottom surfaces of the grooves form one flat surface at a high accuracy, is by no means spoiled. In this case, however, to permit the optical fibers to touch the bottom surfaces of the grooves, it is necessary to take account of the thickness of the buried oxide film when the width W of the openings in the grooves to be formed is calculated. More specifically, let a be the thickness of the oxide film. The width is calculated by subtracting the thickness a from the groove depth d. Therefore, the minimum dimension of the width W of the openings in the grooves is set to $$W = 2\{r \tan(\theta/2) + (d-a)/\tan\theta\}$$

Other objects and features of the invention will appear in the course of the description thereof, which follows.

BRIEF DESCRIPTION OF THE DRAWINGS

FIGS. 1(a)–1(g) are a cross section of an optical fiber guide structure, illustrating Example 1 of a method according to the present invention;

FIG. 3 is a perspective view of the optical fiber guide structure according to the Example 2, illustrating an optical axis alignment test;

FIGS. 4(a)–4(g) are a cross section of an optical fiber guide structure, illustrating Example 3 of a method according to the present invention;

FIGS. 6(a)–6(g) are a cross section of an optical fiber guide structure, illustrating Example 4 of a method according to the present invention;

FIGS. 7(a)–7(g) are a cross section of an optical fiber guide structure, illustrating a modified example of Example 4;

DETAILED DESCRIPTION OF THE INVENTION

Figure 2A:
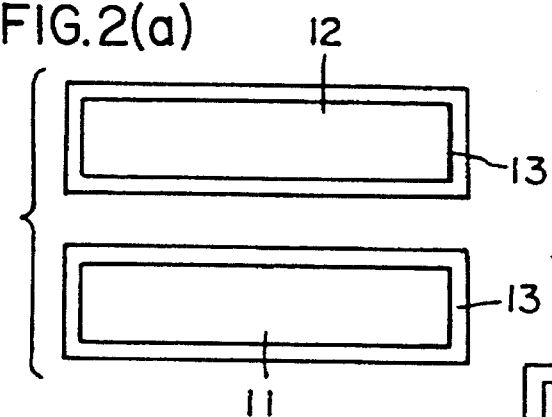
FIGS. 2(a)–2(g) are a cross section of an optical fiber guide structure, illustrating Example 2 of a method according to the present invention.
Figure 2B:
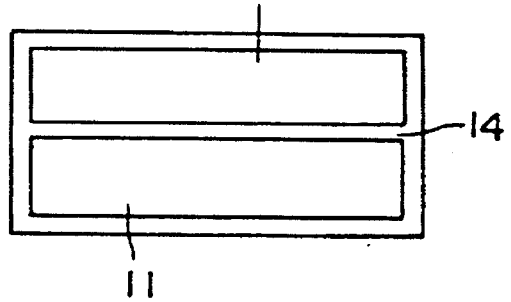
Figure 2C:
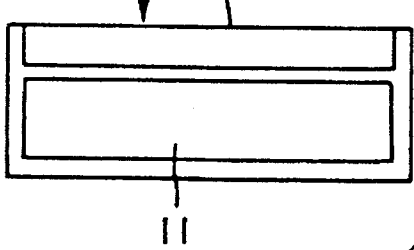
Figure 2D:
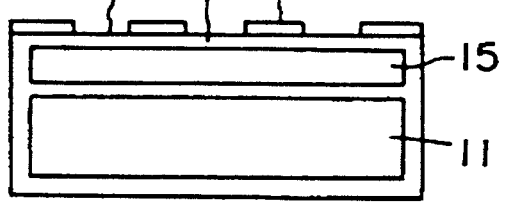
Figure 2E:
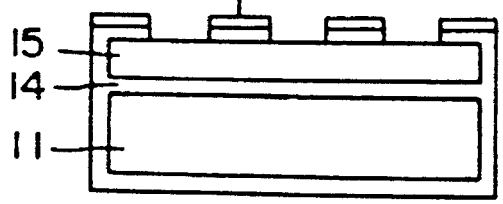
Figure 2F:
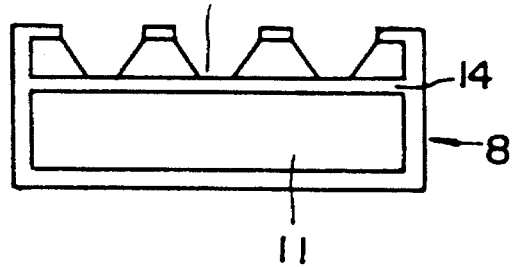

The preferred embodiments of the invention are hereinafter described in detail with reference to the accompanying drawings and using numerical values. Shown in FIGS. 1–9 are a silicon single-crystal substrate 1, a heavily doped p-type diffusion layer 2, an epitaxial silicon layer 3, a masking layer 4 made of an oxide film, a photoresist film 5, windows 6, grooves 7, a grooved substrate 8, a silicon single-crystal support substrate 11, a silicon single-crystal seed substrate 12, a silicon oxide layer 13, a buried silicon oxide layer 14, and a silicon single-crystal film 15. It is to be noted that in the various figures, various parts are not drawn to scale.

EXAMPLE 1

Example 1 of a method of fabricating an optical fiber guide structure according to the present invention is described by referring to FIG. 1(a)–(g).

The face of the silicon single-crystal substrate 1 was of (100) orientation. Boron atoms were diffused into the surface of the substrate 1 at a high concentration to form a heavily doped p-type diffusion layer 2 having a depth of 3 µm (FIG. 1(a)). The dopant concentration at the surface was $10^{20}$ atoms $cm^{-3}$. The dopant concentration was, measured by secondary ion mass spectrometry (SIMS). Subsequently, a silicon film was epitaxially grown on the heavily doped p-type diffusion layer 2 to form an epitaxial silicon layer 3 having a thickness of 80 µm (FIG. 1(b)). The epitaxial layer 3 consisted of a single crystal of silicon. The surface of the epitaxial silicon layer 3 was thermally oxidized to form a masking layer 4 of silicon oxide having a thickness of 0.5 µm. Thus, a laminate was formed (FIG. 1(c)).

After applying a photoresist to the surface of the masking layer 4, three parallel rows of windows 6 were formed in the photoresist film 5 by exposure and development (FIG. 1(d)). The Successive window rows were spaced 250 µm from each other. Each window 6 had a width of 177 µm and a length of 30 mm. Then, the laminate was etched within aqueous solution of buffered hydrofluoric acid ($HF:HFN_4:H_2O=1:15:5$) to remove the exposed masking layer 4, thus forming a pattern (FIG. 1(e)). Thereafter, aqueous solution of 50% by weight of potassium hydroxide was made to act on the epitaxial silicon layer 3 for 20 minutes at liquid temperature of 60° C. to carry out anisotropic etching. In this way, the exposed epitaxial silicon layer 3 was etched away. As a result, the substrate 8 having three parallel rows of grooves 7 of inverted trapezoidal cross section was formed (FIG. 1(f)). Each groove 7 of inverted trapezoidal cross section had a depth of 80 µm, a width of 178 µm, and a length of 30 mm. The positions of all the bottom surfaces of the three rows of grooves 7 were flush with each other within a range of ±0.1 µm. The heavily doped p-type diffusion layer 2 was not etched away within aqueous solution of potassium hydroxide. After the end of the anisotropic etching, the remaining masking oxide film 4 was removed within the aforementioned aqueous solution of buffered hydrofluoric acid. As shown in FIG. 1(g), three optical fibers 9 (each having a core) were fitted into the grooves 7 in the substrate 8 provided with the grooves of inverted trapezoidal cross section. A retaining plate 10 was bonded to the surface of the grooved substrate 8 with adhesive. In this way, the top surfaces of the fibers were secured. Under this condition, the optical fiber guide structure can be used.

In Example 1, the orientation of the face of the silicon single-crystal substrate must be (100). Consequently, the face of the silicon epitaxial film is of (100) orientation. Anisotropic etching forms grooves of inverted trapezoidal cross section in the substrate. If the longitudinal direction of the grooves is made parallel to the (111) plane of the substrate, the grooves of inverted trapezoidal cross section are formed at high dimensional accuracy. If the longitudinal direction is in other directions, the dimensional accuracy deteriorates.

EXAMPLE 2

Example 2 of a method of fabricating an optical fiber guide structure according to the present invention is described by referring to FIGS. 2(a)–(g), and 3.

The face of the silicon single-crystal support substrate 11 was of (100) orientation. Also, the face of the silicon single-crystal seed substrate 12 was of (100) orientation. The substrates 11 and 12 were so disposed that their faces were opposite to each other within an oxygen ambient. They were heat-treated at a temperature of 1100° C. for 20 minutes. Thus, a silicon oxide film 13 having a thickness of 0.25 µm was formed on each surface of both substrates (FIG. 2(a)). Subsequently, the opposite surfaces of both substrates were brought into contact with each other while maintaining the oxygen ambient for the heat treatment and the temperature. Then, the heat treatment was continued for 10 minutes. In this way, the silicon single-crystal support substrate 11 and the silicon single-crystal seed substrate 12 were firmly bonded together. At this time, the silicon oxide layers 13 on the surfaces of the substrates fused together at their junction, thus forming the buried silicon oxide layer 14 (FIG. 2(b)).

Figure 2G:
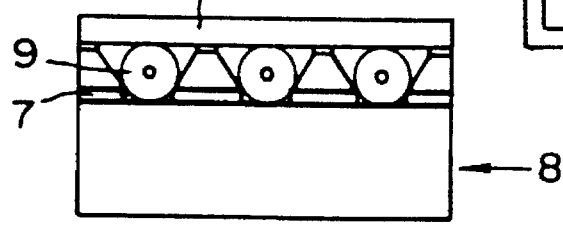

Then, the silicon single-crystal seed substrate 12 was polished to expose the silicon single-crystal layer having a thickness of 80 µm. As a result, a silicon single-crystal film 15 was formed (FIG. 2(c)). Subsequently, the surface of the silicon single-crystal film 15 was thermally oxidized to form a masking layer 4 of silicon oxide having a thickness of 0.5 µm, thus forming a laminate. Thereafter, a photoresist was applied to the surface of the masking layer 4 of silicon oxide. Three parallel rows of windows 6 were formed in the photoresist film 5 by exposure and development (FIG. 2(d)). The successive window rows were spaced 250 µm from each other. Each window 6 had a width of 177 µm and a length of 30 mm. Then, in the same way as in Example 1, the exposed portions of the masking layer 4 were removed (FIG. 2(e)). Also, in the same manner as in Example 1, the exposed portions of the silicon single-crystal film 15 were removed. As a result, a substrate 8 having three parallel rows of grooves 7 of inverted trapezoidal cross section was formed (FIG. 2(f)). Each groove 7 of inverted trapezoidal cross section had a depth of 80 μm, a width of 125 μm, and a length of 30 mm. The positions of all the bottom surfaces of the three rows of grooves 7 were flush with each other within a range of ±0.1 μm. The buried silicon oxide layer 14 was not etched away within aqueous solution of potassium hydroxide. After the end of the anisotropic etching, the remaining masking oxide film 4 and the silicon oxide layer 13 were removed within the aqueous solution of buffered hydrofluoric acid. At this time, the buried silicon oxide layer 14 exposed on the groove bottoms was also removed. As shown in FIG. 2(g), three optical fiber 9 (each having a core) were fitted into the grooves 7 in the substrate 8, each of the grooves being of substantially inverted trapezoidal cross section. A retaining plate 10 was bonded to the surface of the grooved substrate 8 with adhesive. In this way, the top surfaces of the fibers were fixed. Under this condition, the optical fiber guide structure can be used.

Also in Example 2, if the longitudinal direction of the grooves is made parallel to the (111) plane of the silicon single-crystal seed substrate 12, grooves of substantially inverted trapezoidal cross section are formed at high dimensional accuracy. If the longitudinal direction is in other directions, the dimensional accuracy deteriorates.

The substrate 8 having the grooves of substantially inverted-trapezoidal cross section of Example 2 was cut into a strip having a width of 5 mm and a length of 25 mm. Optical fibers 9 were arranged in the grooves 7. A retaining plate 10 was placed on the fibers to anchor them. In this way, a multicore optical connector was obtained (FIG. 3). The optical axes of the connector were aligned with the optical axes of an integrated optical circuit 17 having optical waveguides 16 which were spaced 250 μm from each other. Alignment of the central optical fiber 9c was achieved Simply by aligning the optical axes of the two outer optical fibers 9a and 9b with the respective optical axes of the integrated optical circuit while, monitoring the intensity of transmitted light. Connection losses caused by interconnecting the optical waveguides 16 and the optical fibers 9 were all less than 0.5 dB, which is less than halves of connection losses induced in the prior art structure.

EXAMPLE 3

Example 3 of a method of fabricating an optical fiber guide structure according to the present invention is described by referring to FIGS. 4(a)–(g), and 5(a)–(e).

The face of the silicon single-crystal substrate 1 was of (110) orientation. Boron atoms were diffused into the surface of the substrate 1 at a high concentration to form a heavily doped p-type diffusion layer 2 having a depth of 3 μm (FIG. 4(a)). The dopant concentration at the surface was $10^{20}$ atoms cm$^{-3}$. The dopant concentration was measured by secondary ion mass spectrometry (SIMS). Subsequently, a silicon film was epitaxially grown on the heavily doped p-type diffusion layer 2 to form an epitaxial silicon layer 3 having a thickness of 80 μm (FIG. 4(b)). The epitaxial layer 3 consisted of a single crystal of silicon. The surface of the epitaxial silicon layer 3 was thermally oxidized to form a masking layer 4 of silicon oxide having a thickness of 0.5 μm. Thus, a laminate was formed (FIG. 4(c)).

After applying a photoresist to the surface of the masking layer 4, three parallel rows of windows 6 were formed in the photoresist film 5 by exposure and development (FIG. 4(d)). The successive window rows 6 were spaced 250 μm from each other. Each window 6 had a width of 124 μm and a length of 30 mm. Then, the laminate was etched within aqueous solution of buffered hydrofluoric acid (HF:HFN$_4$:H$_2$O=1:15:5) to remove the exposed masking layer 4, thus forming a pattern (FIG. 4(e)). Thereafter, aqueous solution of 50% by weight of potassium hydroxide was made to act on the epitaxial silicon layer 3 for 20 minutes at liquid temperature of 60° C. to carry out anisotropic etching. In this way, the exposed epitaxial silicon layer 3 was etched away. As a result, the substrate 8 having three parallel rows of grooves 7 of rectangular cross section was formed. Each groove 7 of rectangular cross section had a depth of 80 μm, a width of 125.2 μm, and a length of 30 mm (FIG. 4(f)). The positions of all the bottom surfaces of the three rows of grooves 7 were flush with each other within a range of ±0.1 μm. The heavily doped p-type diffusion layer 2 was not etched away within aqueous solution of potassium hydroxide. After the end of the anisotropic etching, the remaining masking oxide film 4 was removed within the aforementioned aqueous solution of buffered hydrofluoric acid. As shown in FIG. 4(g), three optical fiber 9 (each having a core) were fitted into the grooves 7 in the substrate 8 provided with the grooves of rectangular cross section. A retaining plate 10 was bonded to the surface of the grooved substrate 8 with adhesive. In this way, the top surfaces of the fibers were fixed. Under this condition, the optical fiber guide structure can, be used.

FIG. 5 illustrates the manner in which an optical fiber guide structure is fabricated by a method similar to the above-described Examples.

Figure 5A:
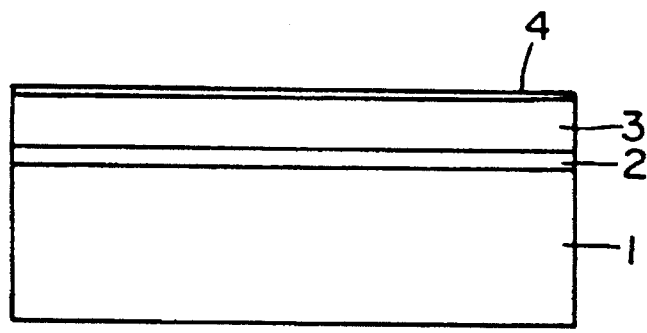
FIGS. 5(a)–5(e) are a cross section of an optical fiber guide structure, illustrating a modified example of Example 3.
Figure 5B:
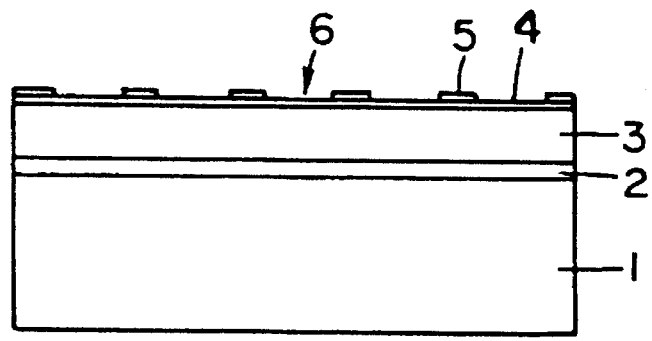
Figure 5C:
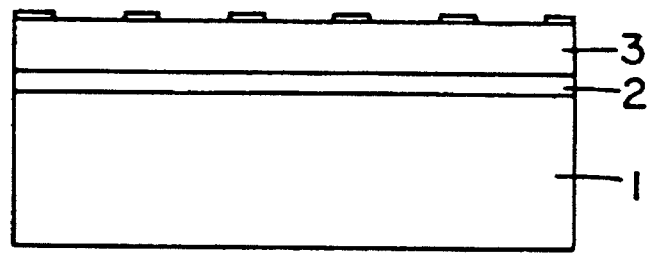
Figure 5D:
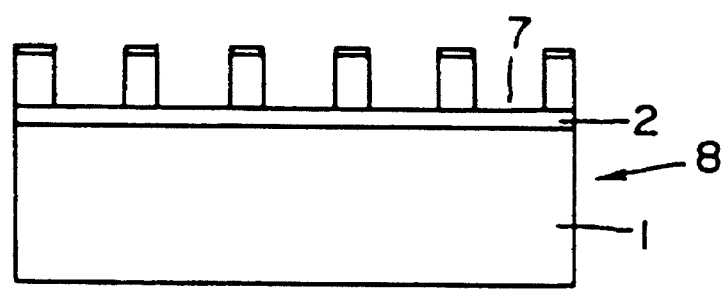
Figure 5E:
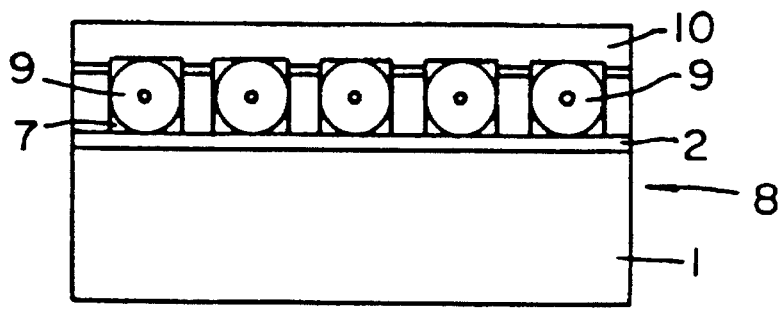

In the present example, the manufacturing process was carried out under the same conditions as the above Examples until the photoresist was applied to the surface of the masking layer 4 except that the masking layer 4 was formed only on the surface of the epitaxial silicon layer 3 (FIG. 5(a)). Then, five parallel rows of windows 6 were formed in the photoresist film 5 by exposure and development (FIG. 5(b)). The successive window rows 6 were spaced 250 μm from each other. Each window 6 had a width of 123 μm and a length of 30 mm. Then, in the same way as in the above Examples, the exposed portions of the masking layer 4 were removed (FIG. 5(c)). Also, in the same way as in the above Examples, the exposed portions of the silicon single-crystal film 15 were removed. As a result, a substrate 8 having the five parallel rows of grooves 7 of rectangular cross section was formed. Each groove 7 of rectangular cross section had a depth of 80 μm, a width of 125 μm, and a length of 30 mm (FIG. 5(d)). The positions of all the bottom surfaces of the five rows of grooves 7 were flush with each other within a range of ±0.1 μm. The heavily doped p-type diffusion layer 2 was not etched away within aqueous solution of potassium hydroxide. As shown in FIG. 5(e), optical fibers 9 each having five cores were fitted into the grooves 7 in the substrate 8 provided with the rectangular grooves. A retaining plate 10 was bonded to the surface of the grooved substrate 8 with adhesive. In this way, the top surfaces of the fibers were fixed. Under this condition, the optical fiber guide structure can be used.

In Example 3, the orientation of the face of the silicon single-crystal substrate must be (110). Consequently, the face of the epitaxial silicon film is also of (110) orientation. The anisotropic etching results in the grooves of rectangular cross section in the substrate. If the longitudinal direction of the grooves is made parallel to the (111) plane of the substrate, grooves of rectangular cross section are formed at high dimensional accuracy. If the longitudinal direction is in other directions, the dimensional accuracy deteriorates.

EXAMPLE 4

Example 4 of a method of fabricating an optical fiber guide structure according to the present invention is described by referring to FIGS. 6(a)–(g), 7(a)–(g), and 8.

The face of a silicon single-crystal support substrate 11 was of (100) orientation, while the face of a silicon single. Crystal seed substrate 12 was of (110) orientation. The substrates 11 and 12 were so disposed that their faces were opposite to each other within an oxygen ambient. They were heat-treated at a temperature of 1100° C. for 20 minutes. Thus, a silicon oxide film 13 having a thickness of 0.25 μm was formed on each surface of both substrates (FIG. 6(a)). Subsequently, the opposite surfaces of both substrates were brought into contact with each other within the oxygen ambient for the heat treatment. Then, the heat treatment was continued for 10 minutes. In this way, the silicon single-crystal support substrate 11 and the silicon single-crystal seed substrate 12 were firmly bonded together. At this time, the silicon oxide layers 13 on the surfaces of the substrates melted together at their junction, thus forming a buried silicon oxide layer 14 (FIG. 6(b)).

Then, the silicon single-crystal seed substrate 12 was polished to expose the silicon single-crystal layer having thickness of 80 μm. As a result, a silicon single crystal film 15 was formed (FIG. 6(c)). Subsequently, the surface of the silicon single-crystal film 15 was thermally oxidized to form a masking layer 4 of silicon oxide having a thickness of 0.5 μm, thus forming a laminate. Thereafter, a photoresist was applied to the surface of the masking layer 4 of silicon oxide. Three parallel rows of windows 6 were formed in the photoresist film 5 by exposure and development (FIG. 6(d)). The successive window rows were spaced 250 μm from each other. Each window 6 had a width of 124 μm and a length of 30 mm. Then, in the same way as in Example 3, the exposed portions of the masking layer 4 were removed (FIG. 6(e)). Also, in the same manner as in Example 3, the exposed portions of the silicon single-crystal film 15 were removed. As a result, a substrate 8 having three parallel rows of grooves 7 of rectangular cross section was formed (FIG. 6(f)). Each groove 7 of rectangular cross section had a depth of 80 μm, a width of 125.2 μm, and a length of 30 mm. The positions of all the bottom surfaces of the three rows of grooves 7 were flush with each other within a range of ±0.1 μm. The buried silicon oxide layer 14 was not etched away by aqueous solution of potassium hydroxide. After the end of the anisotropic etching, the remaining masking oxide film 4 and the silicon oxide layer 13 were removed within the aqueous solution of buffered hydrofluoric acid. At this time, the buried silicon oxide layer 14 exposed on the groove bottoms was also removed. As shown in FIG. 6(g), three optical fibers 9 (each having a core) were fitted into the grooves 7 in the substrate 8. A retaining plate 10 was bonded to the surface of the grooved substrate 8 with adhesive. In this way, the top surfaces of the gibers were anchored. Under this condition, the optical fiber guide structure can be used.

FIG. 7 illustrates the manner in which an optical fiber guide structure is fabricated by a method similar to the above-described Examples.

In the present example, the manufacturing process was carried out under the same conditions as the above Examples until a photoresist was applied to the surface of the masking layer 4. Then, three parallel rows of windows 6 were formed in the photoresist film 5 by exposure and development (FIG. 7, ((a), (b), (c), and (d)). The successive window rows 6 were spaced 250 μm from each other. Each window 6 had a width of 123 μm and a length of 30 mm. Then, in the same way as in the above Examples, the exposed portions of the masking layer 4 were removed (FIG. 7(e)). Also, in the same way as in the above Examples, the exposed portions of the silicon single-crystal film 15 were removed. As a result, a substrate 8 having the three parallel rows of grooves 7 of rectangular cross section was formed. Each groove 7 of rectangular cross section had a depth of 80 μm, a width of 125 μm, and a length of 30 mm (FIG. 7(f)). The positions of all the bottom surfaces of the three rows of grooves 7 were flush with each other within a range of ±0.1 μm. The buried silicon oxide layer 14 was not etched away within aqueous solution of potassium hydroxide. As shown in FIG. 7(g), optical fibers 9 each having three cores were fitted into the grooves 7 in the substrate 8. A retaining plate 10 was bonded to the surface of the grooved substrate 8 with adhesive. In this way, the top surfaces of the fibers were fixed. Under this condition, the optical fiber guide structure can be used.

Also in Example 4, if the longitudinal direction of the grooves is made parallel to the (111) plane of the silicon single-crystal seed substrate 12, grooves of rectangular cross section are formed at high dimensional accuracy. If the longitudinal direction is in other directions, the dimensional accuracy deteriorates.

Figure 8:
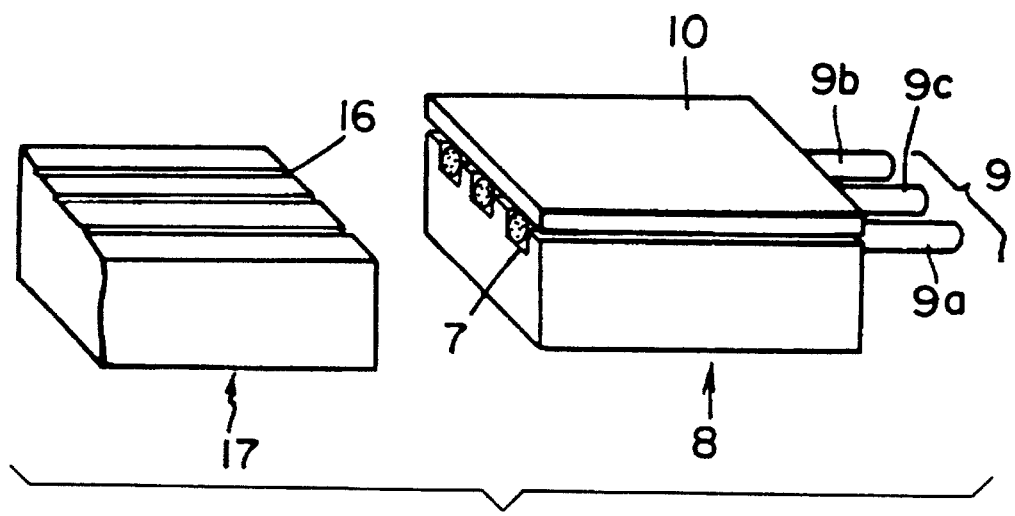
FIG. 8 is a perspective view of the optical fiber guide structure according to Example 4, illustrating an optical axis alignment test.

The substrate 8 having the grooves of rectangular cross section of Example 4 was cut into a strip having a width of 5 mm and a length of 25 mm. The optical fibers 9 were arranged in the grooves 7. The retaining plate 10 was placed on the fibers to fix them. In this way, a multicore optical connector was obtained (FIG. 8). The optical axes of the connector were aligned with the optical axes of an integrated optical circuit 17 having optical waveguides 16 which were spaced 250 μm from each other. Alignment of the central optical fiber 9c was achieved simply by aligning the optical axes of the two outer optical fibers 9a and 9b with the optical axes of the integrated optical circuit while monitoring the intensity of transmitted light. Connection losses caused by interconnecting the optical waveguides 16 and the optical fibers 9 were all less than 0.5 dB, which is less than halves of connection losses induced in the prior art structure.

EXAMPLE 5

Figure 9:
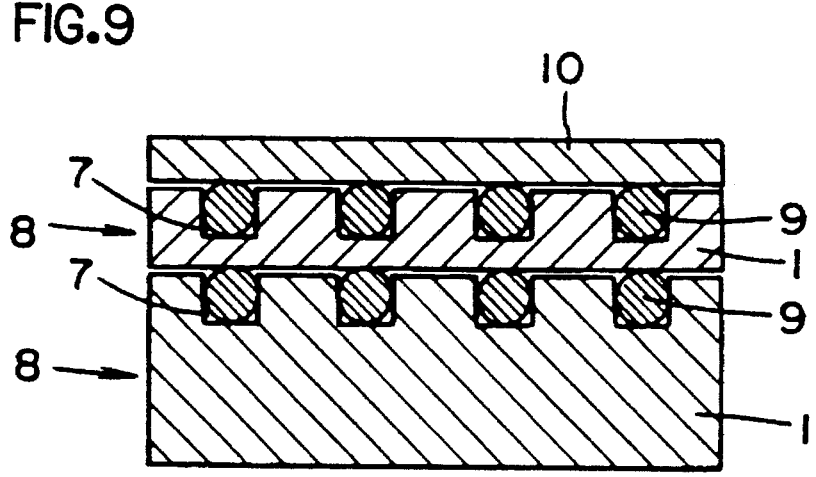
FIG. 9 is a cross sectional view of an optical fiber guide structure, illustrating Example 5 of the invention.
Figure 10:
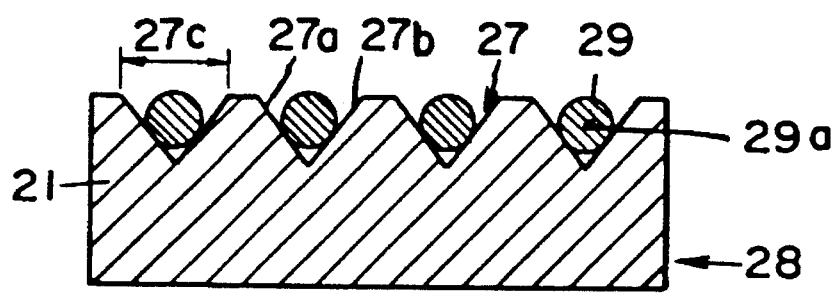
FIG. 10 is a cross sectional view of the prior art optical fiber guide structure provided with V-grooves.

Example 5 of an optical fiber guide structure according to the present invention is shown in the cross section of FIG. 9. In this example, plural substrates 8 provided with grooves of rectangular cross section were stacked on top of each other, and plural rows of optical fibers 9 were laminated. A retaining plate 10 was placed on the top substrate 8.

As described thus far, the present invention can provide an optical fiber guide structure which offers excellent vertical dimensional accuracy, suffers from small connection losses, and facilitates positioning and axial alignments. Also, a method of fabricating such an optical fiber guide structure is provided.

What is claimed is:

1. An optical fiber guide structure comprising:
   a substrate having a face and a surface defining a plane of (111) orientation, said substrate including a doped p-type diffusion layer formed therein adjacent said face,
   a silicon single crystal layer formed on said face of said substrate, and
   a plurality of parallel grooves extending through said silicon single crystal layer in parallel to said plane of (111) orientation, bottom surfaces of said grooves being defined by said doped p-type diffusion layer.

2. The optical fiber guide structure of claim 1, wherein
(A) said silicon single-crystal layer has a face of (100) orientation;
(B) said substrate has a face lying in said (100)-oriented plane of said substrate; and
(C) said grooves are of substantially inverted trapezoidal cross section.

3. The optical fiber guide structure of claim 1, wherein
(A) said silicon single-crystal layer has a face of (110) orientation;
(B) said substrate has a face lying in said (100)-oriented plane of said substrate; and
(C) said grooves are of rectangular cross section.

4. An optical fiber guide structure comprising:
a substrate having a face and a surface defining a plane of (111) orientation,
a silicon oxide layer located on said face of said substrate,
a silicon single crystal layer formed on said silicon oxide layer, and
a plurality of parallel grooves extending through said silicon single crystal layer in parallel with said plane of (111) orientation, bottom surfaces of said grooves being formed by said silicon oxide layer.

5. The optical fiber guide structure of claim 4, wherein
(A) said silicon single-crystal layer has a face of (100) orientation;
(B) said substrate has a face lying in said (100)oriented plane of said substrate; and
(C) said grooves are of substantially inverted trapezoidal cross section.

6. The optical fiber guide structure of claim 4, wherein
(A) said silicon single-crystal layer has a face of (110) orientation;
(B) said substrate has a face lying in said (110)-oriented plane of said substrate; and
(C) said grooves are of rectangular cross section.

7. An optical fiber guide structure comprising:
a silicon substrate having a face and a surface defining a plane of (111) orientation,
a silicon oxide layer located on said face of said substrate,
a silicon single crystal layer formed on said silicon oxide layer, and
a plurality of parallel grooves extending through said silicon single crystal layer and said silicon oxide layer in parallel with said plane of (111) orientation, bottom surfaces of said grooves being formed by said silicon substrate.

8. The optical fiber guide structure of claim 7, wherein
(A) said silicon single-crystal layer has a face of (100) orientation;
(B) said substrate has a face lying in said (100)-oriented plane of said substrate; and
(C) said grooves are of substantially inverted trapezoidal cross section.

9. The optical fiber guide structure of claim 7, wherein
(A) said silicon single-crystal layer has a face of (110) orientation;
(B) said substrate has a face lying in said (110)-oriented plane of said substrate; and
(C) said grooves are of rectangular cross section.

10. A method of fabricating an optical fiber guide structure, comprising the steps of:

forming a doped p-type diffusion layer on a surface of a silicon single-crystal substrate;

forming an undoped, n-type silicon single-crystal film up to a given thickness on said doped p-type diffusion layer so as to have the same crystallographic orientation as said silicon single-crystal substrate;

forming a masking layer on top of said silicon single-crystal film;

removing parts of said masking layer so as to form grooves extending parallel to a (111) plane of said silicon single-crystal substrate and to expose parts of said silicon single-crystal film; and then removing said exposed parts of said silicon single-crystal film.

11. A method of fabricating an optical fiber guide structure as set forth in claim 4, wherein said surface of said silicon single-crystal substrate is of (100) orientation.

12. A method of fabricating an optical fiber guide structure as set forth in claim 10, wherein said surface of said silicon single-crystal substrate is of (110) orientation.

13. A method of fabricating an optical fiber guide structure, comprising the steps of:

oxidizing a first surface of a silicon substrate and a first surface of a silicon single-crystal seed substrate;

placing said first surfaces of said substrates opposite to each other and bringing said first surfaces into intimate contact with each other;

heat-treating said substrates;

removing a second said surface of said silicon single-crystal seed substrate opposite said first surface up to a given depth to form a silicon single-crystal film;

forming a masking layer on said surface of said silicon single-crystal seed substrate over said silicon single-crystal film;

then removing parts of said masking layer so as to form grooves extending parallel to a (111) plane of said silicon single-crystal seed substrate and to expose parts of said silicon single-crystal film; and then removing said exposed parts of said silicon single-crystal film.

14. A method of fabricating an optical fiber guide structure as set forth in claim 13, wherein said surface of said silicon substrate is of arbitrary orientation, and wherein said surface of said silicon single,crystal seed substrate is of (100) orientation.

15. A method of fabricating an optical fiber guide structure as set forth in claim 13, wherein said surface of said silicon substrate is of arbitrary orientation, and wherein said surface of said silicon single-crystal seed substrate is of (110) orientation.

16. A method of fabricating an optical fiber guide structure, comprising the steps of:

forming a doped p-type diffusion layer on a surface of a silicon single-crystal substrate;

forming a doped p-type silicon single-crystal film up to a given thickness on said doped p-type diffusion layer so as to have the same crystallographic orientation as said silicon single-crystal substrate;

forming a masking layer on top of said silicon single-crystal film;

removing parts of said masking layer so as to form grooves extending parallel to a (111) plane of said silicon single-crystal substrate and to expose parts of said silicon single-crystal film; and then removing said exposed parts of said silicon single-crystal film.

17. A method of fabricating an optical fiber guide structure as set forth in claim 16, wherein said surface of said silicon single-crystal substrate is of (100) orientation.

18. A method of fabricating an optical fiber guide structure as set forth in claim 16, wherein said surface of said surface of said silicon single-crystal substrate is of (110) orientation.

* * * * *